United States Patent [19]
Koga et al.

[11] Patent Number: 5,912,754
[45] Date of Patent: Jun. 15, 1999

[54] METHOD FOR TRANSMITTING WDM OPTICAL SIGNAL TO BE AMPLIFIED BY OPTICAL AMPLIFICATION REPEATERS AND SYSTEMS USED IN SAME

[75] Inventors: Tadashi Koga; Yasuhiro Aoki, both of Tokyo, Japan

[73] Assignee: NEC Corporation, Tokyo, Japan

[21] Appl. No.: 08/733,690

[22] Filed: Oct. 17, 1996

[30] Foreign Application Priority Data

Oct. 18, 1995  [JP]  Japan ................... 7-269892

[51] Int. Cl.$^6$ ............................................. H04B 10/00
[52] U.S. Cl. ..................... 359/179; 359/174; 359/178
[58] Field of Search ........................... 359/121, 125, 359/137, 167, 133, 134, 345, 174, 179, 178, 160, 124

[56] References Cited

U.S. PATENT DOCUMENTS

| | | |
|---|---|---|
| 4,899,043 | 2/1990 | Mochizuki et al. ............... 359/114 |
| 5,396,360 | 3/1995 | Majima ............................. 359/133 |
| 5,406,404 | 4/1995 | DiGiovanni et al. .............. 359/161 |
| 5,510,925 | 4/1996 | Suzuki et al. ..................... 359/179 |
| 5,559,910 | 9/1996 | Taga et al. ........................ 359/179 |
| 5,717,510 | 2/1998 | Ishikawa et al. .................. 359/179 |

OTHER PUBLICATIONS

Horicuhi et al. (1993), "Line Supervisory and Fault Localization of OS–A System", S16 Poster Session (3) pp.: 508–512.

*Primary Examiner*—Edward Lefkowitz
*Attorney, Agent, or Firm*—Scully, Scott, Murphy & Presser

[57] ABSTRACT

It is the object of the invention to eliminate a limitation on the transmission distance of a WDM optical transmission system caused by wavelength dependencies of gains of optical amplification repeaters. The transmission characteristic of optical signal of the transmission system against the signal wavelength can be flatted by using plural kinds of the optical amplification repeaters with different gain peak wavelengths, and the longer transmission distance can be obtained.

9 Claims, 2 Drawing Sheets

METHOD FOR TRANSMITTING WDM OPTICAL SIGNAL TO BE AMPLIFIED BY OPTICAL AMPLIFICATION REPEATERS AND SYSTEMS USED IN SAME

FIELD OF THE INVENTION

The invention relates to an optical fiber communication in which optical signals are transmitted through an optical fiber, and especially to a method for transmitting a wavelength division multiplexed (WDM, hereinafter) optical signal to be amplified by optical amplification repeaters, and a system used in the same.

BACKGROUND OF THE INVENTION

Nowadays, in the field of optical fiber communication, there are increasing demands for large capacity of information to be transmitted and long transmission distance. Hitherto, the optical communication system, in which a single optical signal is transmitted through a single optical fiber in an optical cable, has been put to practical use. However, in the aforementioned optical communication system, a transmitter and a receiver are required to have wide band characteristics in order to increase the capacity of information to be transmitted. Moreover, an average received power level must be increased in order to decrease error rate of a received signal, and a spacing between adjacent repeaters must be decreased in the case of a multi-stage repeater system.

On the other hand, the development of the WDM optical transmission system, in which the plural optical signals with the different wavelengths are multiplexed and propagate through the same optical fiber, is being actively developed as a technology for increasing multiplexed density of the optical fiber communication without increasing the transmission capacity of a single optical signal.

In the WDM optical transmission system, the optical signals are transmitted through the optical fiber and amplified by a multi-stage repeater system, which is arranged along the optical fiber line. In many cases, Er-doped optical fiber amplifiers are used as the optical direct amplification repeaters. However, since the gain of the Er-doped optical fiber amplifier depends on the wavelength of the optical signal, a characteristic dependence of the gain on the signal wavelength is accumulated by the multi-stage amplifications, and the gains of the multiplexed optical signals are changed in accordance with their wavelengths. Consequently, the optical signals corresponding to smaller gain are attenuated in the multi-stage amplifications, and it has been an important factor of difficulty of a long distance transmission.

SUMMARY OF THE INVENTION

Accordingly, it is an object of the invention to remove a limitation on a distance of an optical signal transmission system caused by the wavelength dependence of the gains of the optical direct amplification repeaters, and provide a method for transmitting a WDM optical signal over a longer distance than that of a conventionally proposed WDM optical signal transmission system.

Accordingly, it is an further object of the invention to remove a limitation on a distance of an optical signal transmission system caused by the wavelength dependence of the gains of the optical direct amplification repeaters, and provide a system for transmitting a WDM optical signal over a longer distance than that of a conventionally proposed optical signal transmission system.

According to the first feature of the invention, the method for transmitting the wavelength division multiplexed optical signals to be amplified by the optical amplification repeaters according to the invention comprises the steps of:

multiplexing optical signals of predetermined wavelengths to provide the wavelength division multiplexed optical signal;

transmitting the wavelength division multiplexed optical signal through an optical fiber transmission line; and amplifying the wavelength division multiplexed optical signal at predetermined repeating points of the optical fiber transmission line by the optical amplification repeaters, the optical amplification repeaters being divided into a plurality of kinds having gain peak wavelengths which are different from each other.

According to the second feature of the invention, the system for transmitting a wavelength division multiplexed optical signal to be amplified by the optical amplification repeaters according to the invention comprises:

a plurality of optical transmitters for transmitting a plurality of optical signals of predetermined wavelengths different from each other;

an optical coupler for multiplexing the plurality of optical signals to provide a wavelength division multiplexed optical signal;

an optical fiber for propagating the wavelength division multiplexed optical signal;

means for amplifying the wavelength division multiplexed optical signal at predetermined points of the optical fiber by the optical amplification repeaters;

an optical splitter for splitting the wavelength division multiplexed optical signal propagated through the optical fiber to provide the plurality of optical signals of the predetermined wavelengths;

a plurality of optical receivers for receiving the plurality of optical signals of the predetermined wavelengths splitted by the optical splitter;

wherein the optical amplification repeaters are divided into a plurality of kinds having gain peak wavelengths different from each other.

BRIEF DESCRIPTION OF THE DRAWINGS

The invention will be explained in more detail in conjunction with the appended drawings, wherein.

DESCRIPTION OF THE PREFERRED EMBODIMENTS

Next, the preferred embodiment will be explained referring to appended drawings.

Figure 1:
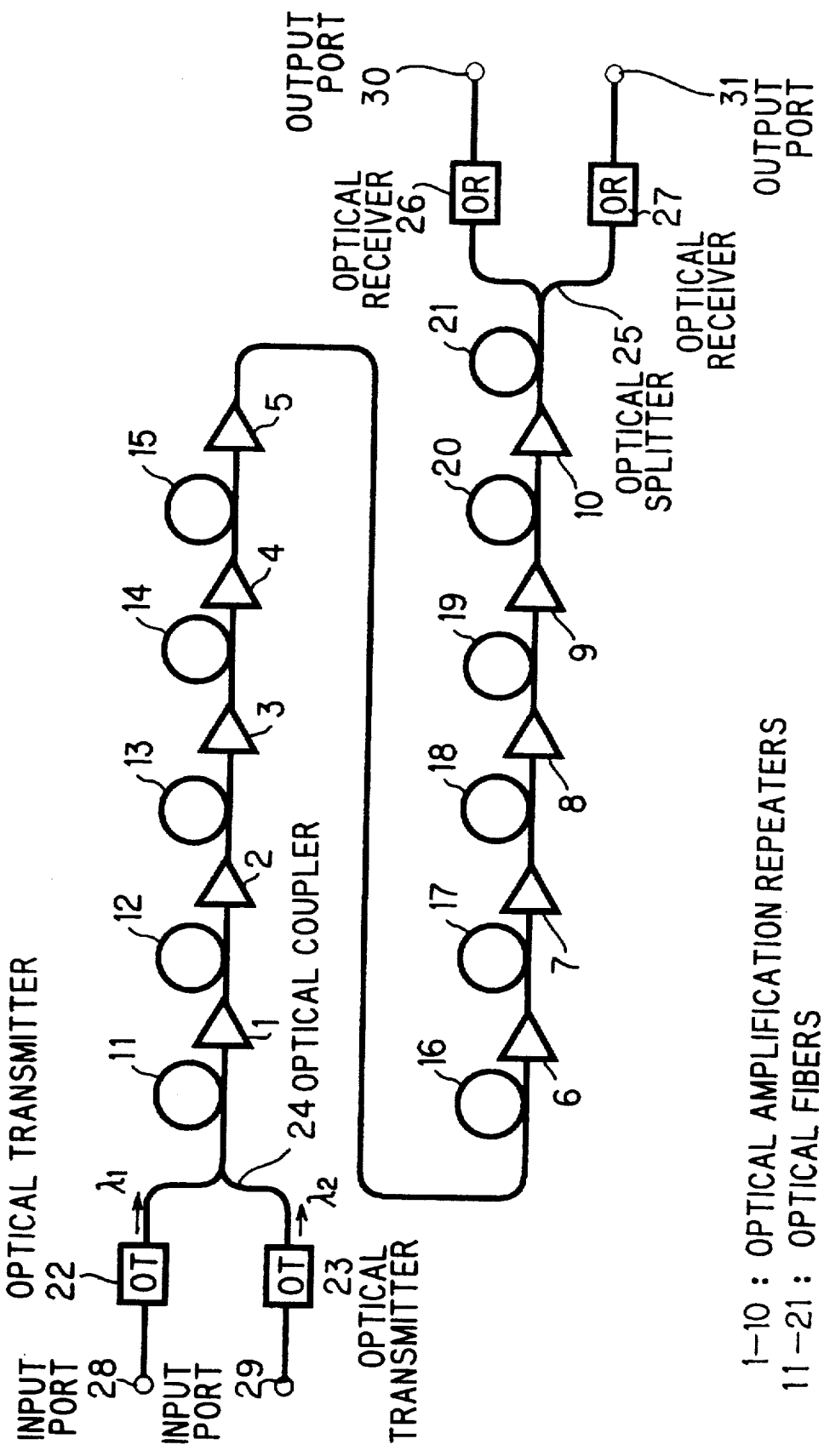
FIG. 1 shows the structure of a preferred embodiment of the invention.

FIG. 1 shows the construction of a WDM optical amplification repeating system according to the invention.

This drawing shows an example, in which two optical signals with the wavelengths of 1556 nm ($\lambda 1$) and 1559 nm (λ2) are multiplexed and transmitted through the same optical fiber, being amplified by ten optical direct amplification repeaters.

In FIG. 1, each of the optical repeaters 1, 3, 5, 7 and 9 has a gain peak wavelength of 1554 nm (λA) and is an Er-doped optical fiber amplifier pumped by an InGaAs/InP Fabry-Perot type semiconductor laser with a lasing wavelength of 1.48 μm. Moreover, each of the optical repeaters 2, 4, 6, 8 and 10 has a gain peak wavelength of 1561 nm (λB) and is the same optical fiber amplifier as that mentioned in the above. The gain peak wavelength can be shifted by changing the length of the Er-doped optical fiber. The gain of the optical repeater is 18 dB at the gain peak wavelength.

The optical fibers 11–21 compose an optical transmission line, in which each of these fibers has a mode field diameter of 8 μm (λ=1558 nm), a fiber loss of 0.21 dB/km, and a chromatic dispersion of 1 ps/nm/km, and is a dispersion shifted optical fiber. The spacing between the adjacent repeaters is about 30 km to 100 km with a length of 80 km.

Optical transmitters 22 and 23 are respectively provided with InGaAs/InP Distributed Feedback Bragg reflector (DFB) semiconductor lasers with lasing wavelengths of 1.55 μm, output optical powers of which are externally modulated by optical modulators made of lithium-niobate (LiNbO$_3$). An optical coupler 24 and an optical splitter 2 are single mode optical fiber couplers. Optical receivers 26 and 27 are respectively composed of optical pre-amplifiers and GaAs-PIN photo-diodes, where the respective optical pre-amplifiers are provided with optical band pass filters positioned output sides thereof, and the central wavelengths of passing bands are respectively λ1 and λ2. The optical pre-amplifier is an Er-doped optical fiber amplifier pumped by InGaAs/Inp Fabry-Perot type semiconductor laser with a lasing wavelength of 1.48 μm.

In this embodiment, electrical signals supplied from input ports 28 and 29 are respectively converted into optical signals in the optical transmitters 22 and 23. After the optical signals are multiplexed by an optical coupler 24, the optical signals are supplied to the optical fiber 11. Thereafter, the optical signals propagate through the optical fiber amplification repeaters and the optical fibers, are divided into two groups of optical signal waves by an optical splitter 25, and respectively converted into electrical signals in the optical receivers 26 and 27. The electrical signals thus obtained are respectively transmitted to next stages via output ports 30 and 31.

Figure 2:
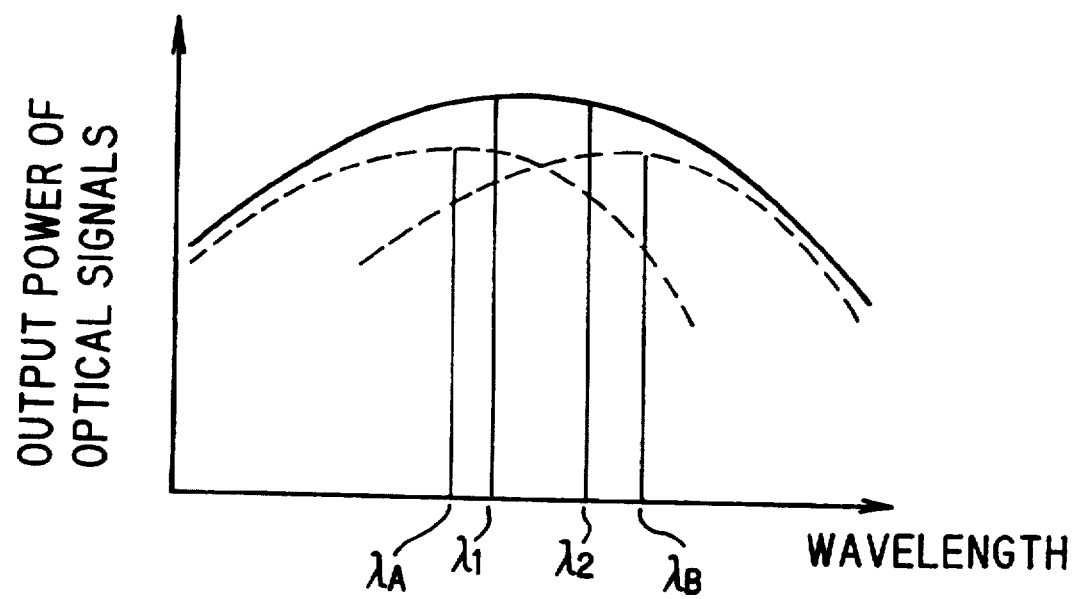
FIG. 2 shows transmission characteristics of optical signals as functions of a wavelength, in a case where the number of the kinds of optical amplification repeaters is two, and two optical amplification repeaters of different kinds are cascaded.
Figure 3:
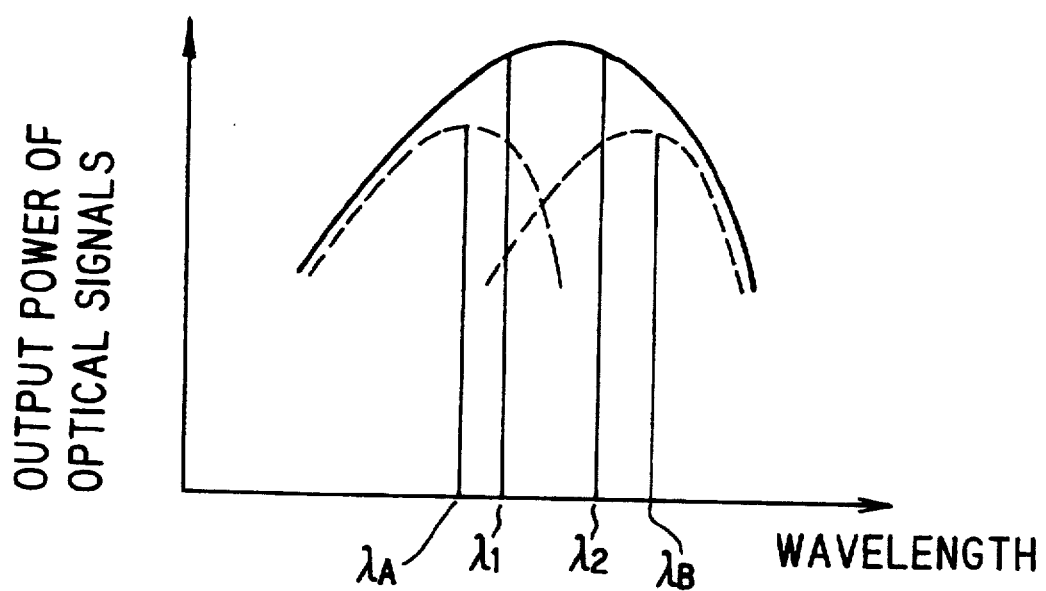
FIG. 3 shows transmission characteristics of optical signals as functions of a wavelength, in a case where the number of the kinds of optical amplification repeaters is two, and ten repeaters are cascaded as a whole.

FIGS. 2 to 3 respectively show transmitted signal levels of the optical amplifier repeater system, which is a preferred embodiment of the invention, as functions of the signal wavelength. FIG. 2 and FIG. 3 respectively show the transmitted optical signal levels against the wavelength after repeating of two and ten stages. In this embodiments, a sufficiently wide gain band can be obtained by using two kinds of optical amplification repeaters, the gain peak wavelengths of which are respectively 1554 nm and 1561 nm. In the transmission characteristic against the signal wavelength shown in FIG. 3, which shows the signal levels after repeating of ten stages, the difference of the gains between the two optical signals is about 0.2 dB, and decreases of the widths of the gain bands and increases of the attenuations of the two optical signals cannot be observed.

On the other hand, an experiment, in which the ten optical fiber amplification repeaters of one kind are cascaded and the gain peak wavelength of them is 1554 μm or 1561 μm, is carried out in order to compare the results obtained with those obtained in the embodiment of the invention. In the aforementioned experiment, the difference of the gains between the two optical signals is about 3 dB, and in other words, the optical power ratio of them is about 2:1, and the SNR of the optical signal with a lower output power is considerably decreased.

The extent of the invention is never restricted within the aforementioned embodiment. The number of the optical signals and that of kinds of the optical fiber amplification repeaters are never restricted to two. The embodiment of the invention should be so constructed that even an optical signal suffering the largest attenuation can be suitably received.

In the aforementioned embodiment, the number of kinds of the optical fiber amplification repeaters and that of the wavelengths of the optical signals are equally 2, but the gain peak wavelengths of the optical fiber amplification repeaters differ from the wavelengths of the optical signals. However, the gain peak wavelengths of the optical fiber amplification repeaters can be wholly or partially the same as the wavelengths of the optical signals. The number of kinds of the optical fiber amplification repeaters with the different gain peak wavelengths is either the same with or different from the number of the optical signals to be transmitted in the WDM transmission system. In such case, the wavelengths of the one or plural optical signals can coincide with the gain peak wavelengths of the optical fiber amplification repeaters. However, in a case where the number of kinds of the optical fiber amplification repeaters is larger than that of the optical signals, the structure of the system becomes complicated, and remarkable improvements cannot be obtained in some cases. In either case, the transmission system can be suitably constructed in accordance with the wavelength dependence of the optical amplification repeaters, and the characteristics of devices and the optical fibers which construct the optical transmission system.

The optical fiber amplification repeater is never restricted to the Er-doped optical fiber amplification repeater, and can be a repeater comprising a semiconductor laser amplifier. The width of the gain band can be freely selected. The optical fiber amplification repeaters with the different gain peak wavelengths are not necessarily arranged alternately.

GaAlAs/GaAs or other material can be used as that of a semiconductor laser. The semiconductor lasers with other structures, other kinds of lasers, such as a gas laser and etc., or those having other lasing wavelengths can be used in the embodiments of the invention, as optical sources for optical signals or pumping optical powers. A semiconductor optical modulator is applicable to the embodiment of the invention. An optical fiber with other chromatic dispersion of other value can be used.

As mentioned in the above, in the method for transmitting the WDM optical signal and the system used therein according to the invention, since the optical signal is amplified by the plural optical amplification repeaters with the different gain peak wavelengths, the limitation on the transmission distance caused by the wavelength dependence of the gain of the optical signal is eliminated, and the optical signal can be transmitted over the longer distance than that of the conventionally proposed WDM optical transmission system.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for transmitting a wavelength division multiplexed optical signal to be amplified by optical amplification repeaters, comprising the steps of:

multiplexing optical signals of predetermined wavelengths to provide said wavelength division multiplexed optical signal;

transmitting said wavelength division multiplexed optical signal through an optical fiber transmission line; and amplifying said wavelength division multiplexed optical signal at predetermined repeating points of said optical fiber transmission line by said optical amplification repeaters, wherein said optical amplification repeaters, are divided into a plurality of kinds of optical amplification repeaters, wherein each kind of optical amplification repeater has a gain peak wavelength which is different from each other kind of optical amplification repeater, and wherein each kind of optical amplification repeater includes a plurality of optical amplification repeaters having the same identical gain peak wavelength.

2. The method as defined in claim 1, wherein:

said plurality of kinds are equal to or less than a number of said optical signals of said predetermined wavelengths.

3. The method as defined in claim 1, wherein:

said gain peak wavelengths are different from said predetermined wavelengths of said optical signals.

4. The method as defined in claim 1, wherein:

said gain peak wavelengths are equal to said predetermined wavelengths of said optical signals.

5. A system for transmitting a wavelength division multiplexed optical signal to be amplified by optical amplification repeaters, comprising:

a plurality of optical transmitters for transmitting a plurality of optical signals of predetermined wavelengths different from each other;

an optical coupler for multiplexing said plurality of optical signals to provide a wavelength division multiplexed optical signal;

an optical fiber for propagating said wavelength division multiplexed optical signal;

means for amplifying said wavelength division multiplexed optical signal at predetermined points of said optical fiber by said optical amplification repeaters;

an optical splitter for splitting said wavelength division multiplexed optical signal propagated through said optical fiber to provide said plurality of optical signals of said predetermined wavelengths;

a plurality of optical receivers for receiving said plurality of optical signals of said predetermined wavelengths splitted by said optical splitter;

wherein said optical amplification repeaters are divided into a plurality of kinds of optical amplification repeaters, wherein each kind of optical amplification repeater has a gain peak wavelength which is different from each other kind of optical amplification repeater, and wherein each kind of optical amplification repeater includes a plurality of optical amplification repeaters having the same identical gain peak wavelength.

6. The system as defined in claim 5, wherein:

said plurality of kinds are equal to or less than a number of said optical signals of said predetermined wavelengths.

7. The system as defined in claim 5, wherein:

said gain peak wavelengths are different from said predetermined wavelengths of said optical signals.

8. The system as defined in claim 5, wherein:

said gain peak wavelengths are equal to said predetermined wavelengths of said optical signals.

9. In a method for transmitting a wavelength division multiplexed optical signal, in which plural optical signals having different wavelengths from each other are transmitted through an optical fiber and are amplified by multi-stage optical amplification repeaters, a plurality of said optical amplification repeaters are divided into a plurality of kinds of optical amplification repeaters, wherein each kind of optical amplification repeater has a gain peak wavelength which is different from each other kind of optical amplification repeater, and wherein each kind of optical amplification repeater includes a plurality of optical amplification repeaters having the same identical gain peak wavelength.

* * * * *